Figure 1:
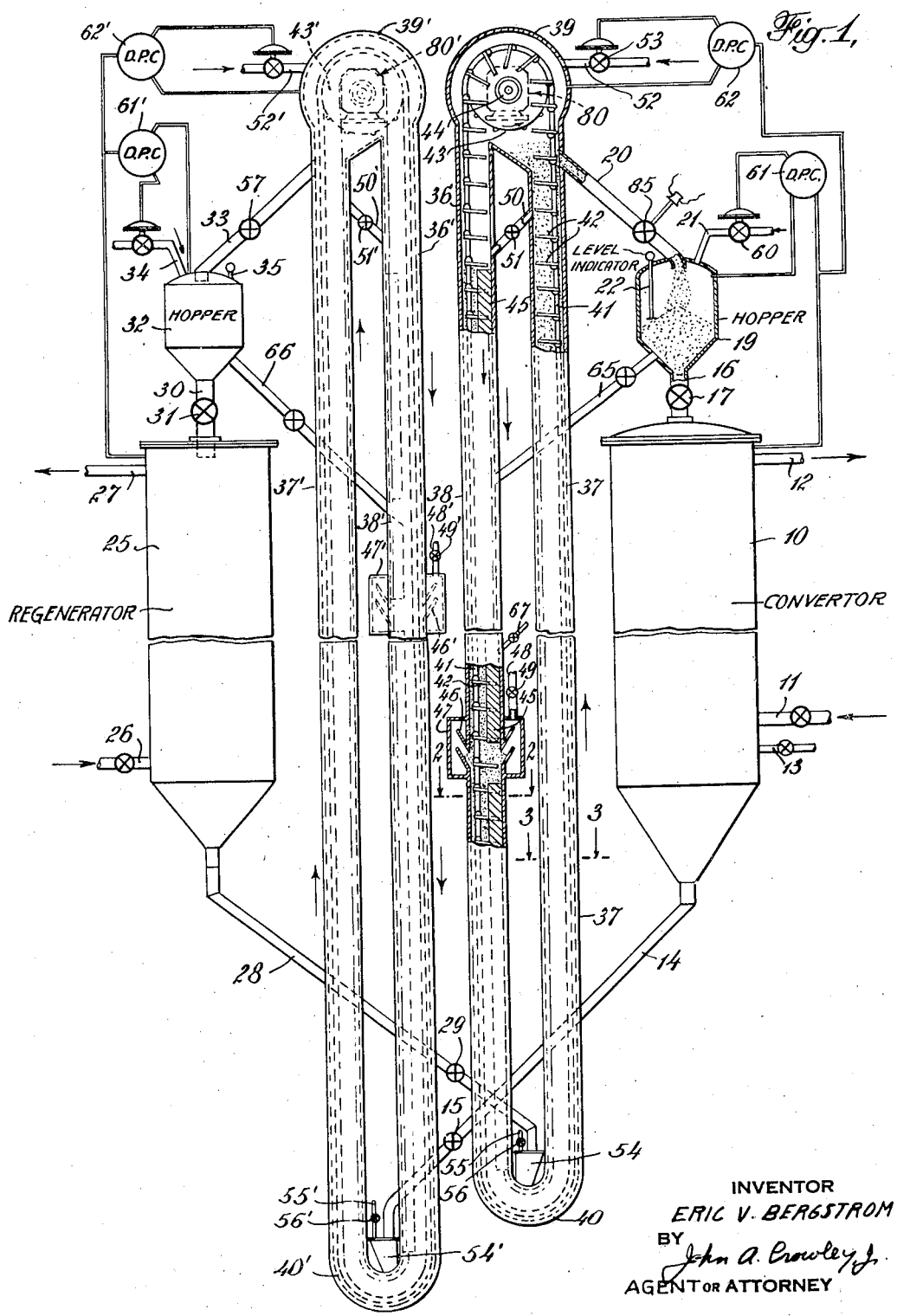

June 15, 1948.  E. V. BERGSTROM  2,443,180
METHOD AND APPARATUS FOR TRANSFER OF PARTICLE FORM SOLIDS
Filed June 23, 1945  2 Sheets-Sheet 1

Fig. 1,

INVENTOR
ERIC V. BERGSTROM
BY John A. Crowley Jr.
AGENT OR ATTORNEY

June 15, 1948. E. V. BERGSTROM 2,443,180
METHOD AND APPARATUS FOR TRANSFER OF PARTICLE FORM SOLIDS
Filed June 23, 1945 2 Sheets-Sheet 2

INVENTOR
ERIC V. BERGSTROM
BY
John A. Crowley Jr.
AGENT OR ATTORNEY

Patented June 15, 1948

2,443,180

UNITED STATES PATENT OFFICE 2,443,180

METHOD AND APPARATUS FOR TRANSFER OF PARTICLE FORM SOLIDS

Eric V. Bergstrom, Short Hills, N. J., assignor to Socony-Vacuum Oil Company, Incorporated, a corporation of New York Application June 23, 1945, Serial No. 601,089

22 Claims. (Cl. 196—52)

This invention has to do with a method and apparatus for transfer of particle form solid material between zones wherein it is contacted with different gases, often under different gaseous pressures while maintaining a substantial seal between said zones. The invention is applicable to any of a number of processes involving the flow of a particle form solid through separate chambers wherein it is contacted with gaseous materials. Exemplary of such processes are gas adsorption, gas treatment, solid treatment, solid-gas heat exchange, shale and ore roasting and catalytic conversion processes. This invention is particularly applicable to hydrocarbon catalytic conversion processes. Recently such hydrocarbon conversion processes have taken the form of one wherein a particle form catalyst is passed cyclically through a conversion zone wherein it is contacted at high temperatures with hydrocarbon vapors to accomplish the conversion thereof and causing the deposition of carbonaceous contaminants upon the catalyst and then through a regeneration zone wherein it is contacted at high temperatures with a combustion supporting gas such as air to effect the burning of the contaminant deposit from the catalyst. The hydrocarbon charge to the conversion zone may be a gas oil in which case it may be converted at temperatures of the order of 800° F. and above and usually superatmospheric pressures to gas, gasoline and cycle oil. On the other hand, the charge to the conversion zone may be gasoline, or heavy naphtha in which case a high temperature treatment or molecular rearrangement may be the purpose.

The catalyst may take the form of a natural or treated clay or bauxite or it may consist of any of a number of synthetic associations of silica, alumina or silica and alumina to which other materials such as metallic oxides may be added for specific purposes inherent in the conversion for which it is used. The catalyst may be pelletted, spherical or granular in form and its particle size may vary depending on the method of its tranfer through the conversion vessels. For processes wherein the catalyst passes through the conversion vessel as a substantially compact column of gravity flowing particles, the catalyst mesh size may range between 8 to 100 mesh and may preferably range between 8 to 20 mesh by Tyler standard screen analysis.

In such cyclic, continuous conversion processes, it is, of course, important to prevent interflow of gases between the regeneration and conversion vessels and to prevent the escape of the high temperature hydrocarbon vapors into the atmosphere. In certain instances either the reactor or regeneration vessel may be operated at the higher pressure although more often it is customary to operate the reactor at a pressure somewhat higher or equal to that in the regenerator. In any case, it will be apparent that a major difficulty arises in the transfer of catalyst from one vessel to the other while preventing interflow of gases between the vessels. Heretofore it has been customary to employ complicated lock and seal chamber arrangements, mechanical, gas tight forced feed valves or star valves or screw conveyors in addition to various types of elevating conveyors in order to accomplish the transfer of catalyst between reactor and regenerator vessels. Lock and seal chamber arrangements are expensive, complicated and space consuming and require a large amount of complicated instrumentation which is susceptible to frequent failure. Forced feed valves and screw conveyors involve close metal to metal clearances which give rise to excessive and highly undesirable catalyst particle attrition. In the copending application Serial Number 601,090, filed in the United States Patent Office on June 23, 1945, of which this inventor is one of the applicants, there is disclosed and claimed a method and apparatus for transfer of particle form solid material between separate vessels which material and apparatus avoid the disadvantage and difficulties of the methods of the prior art. According to the invention described in that application, particle form solid material is transferred between separate chambers by means of modified draft type conveyors. These conveyors are of the type wherein an endless draft chain is moved through communicating rising and descending legs, so as to conduct solid material entering one chamber near the lower end of the rising leg upwardly therethrough to a discharge point from which it is passed as a confined gravity flowing stream to the second chamber. In order to provide a seal between the chambers, a portion of the solid material reaching the upper section of the rising leg is passed into the descending leg so as to provide a substantially compact seal column of solid material therein similar to the column thereof in the communicating rising leg. The above mentioned application was particularly directed to a method and apparatus adopted to handle contact mass particles of the larger sizes, ranging upwards, for example from particles of about ⅜" average diameter. It has been found that when such a method and apparatus as above described is employed particularly with material of small particle size such as those presently used for the more common cracking catalysts in moving bed type processes or even with materials of larger particle size when a large number of degraded particles of small size are present, there is a tendency for an excessive packing of the solid material particles at the lower end of the descending leg and in that section of the conveyor communicating the rising and descending legs. This causes an excessive frictional resistance to the movement of the conveyor flights resulting in excessive power requirements and wear on the equipment and often in clogging of the operation entirely. The present invention is specifically directed to certain improvements to the above described method and apparatus whereby the rate of solid material downward flow in the descending leg may be more readily controlled and the resistance to movement of the conveying mechanism be substantially reduced.

A major object of this invention is the provision in a hydrocarbon conversion process of an improved method and apparatus for transfer of particle form solid catalytic material between reaction and regeneration chambers without excessive catalyst attrition and while providing a substantial seal between the reaction and regeneration chambers.

Another object of this invention is the provision in a process wherein a particle form solid material is passed serially through two separate solid-gas contacting chambers of an economical method and apparatus for transfer of said solid material between said chambers while preventing excessive attrition of the solid material and while preventing substantial interflow of gaseous material between the chambers.

Figure 2:
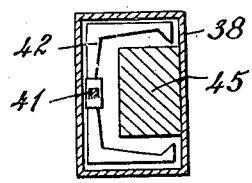
Figure 3:
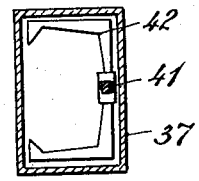
Figure 4:
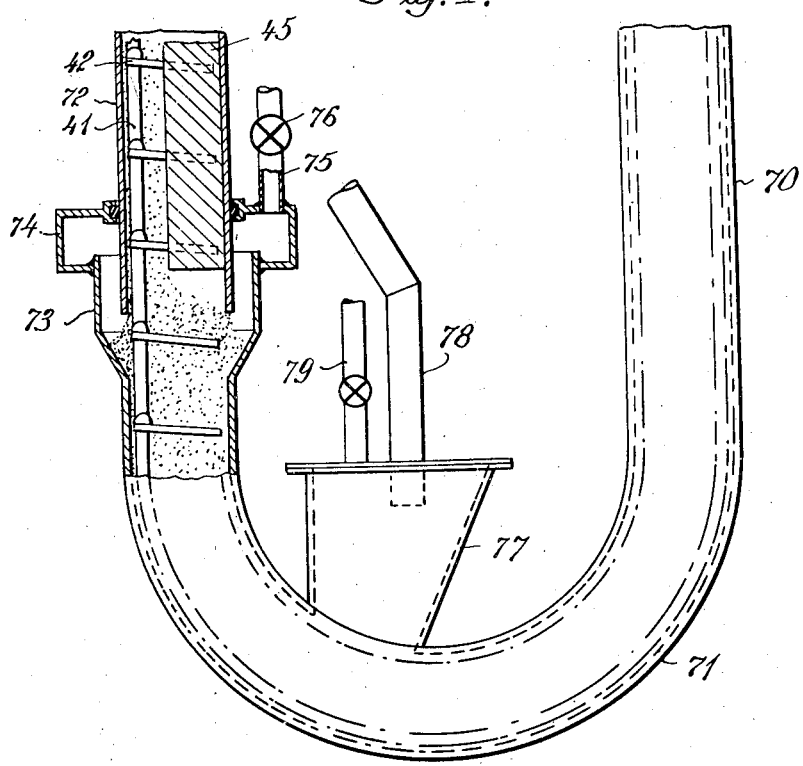

These and other objects of this invention will become apparent from the following description of the drawings attached hereto of which Figure 1 is an elevational view, partially in section showing the application of this invention to a cyclic hydrocarbon conversion process. Figure 2 is a cross-sectional view taken at line 2—2 on Figure 1. Figure 3 is a cross-sectional view taken at line 3—3 on Figure 1, and Figure 4 is a detail of a modified form of the lower section of conveyors shown in Figure 1. All of these drawings are highly diagrammatic in form.

Turning now to Figure 1, we find an upright reaction vessel 10 which may be of any desired cross-sectional shape. The reaction vessel is provided with a reactant inlet 11, a reactant outlet 12, a purge gas inlet 13, a catalyst drain conduit 14 with throttle valve 15 thereon and a catalyst inlet conduit 16 with throttle valve 17 thereon at its upper end. Above the reactor and connected thereto through conduit 16 is a surge hopper 19, having a catalyst inlet conduit 20 and a gas inlet conduit 21 at its upper end. Also provided on the surge hopper 19 is a catalyst level indicator 22 which may be any of a number of types commonly used for such purposes. A valve 85 is provided on conduit 20. This valve may be principally used as an emergency throttle or shut-off valve and may be of an automatic motorized type adapted to close upon excessive sudden increase of reactor operating pressure. Also shown in Figure 1 is a regeneration vessel 25 having a combustion gas inlet 26 at its lower end and a flue gas outlet 27 at its upper end, and also provided with a catalyst outlet conduit 28 bearing throttling valve 29 on its lower end and a catalyst inlet conduit 30 bearing throttling valve 31 on its upper end. Inasmuch as no invention is claimed for the construction of the regeneration and reaction vessels per se, the internal construction thereof is not described. It will be understood, however, that these vessels may be provided internally with adequate means for distribution and direction of gas flow and for the disengagement of gas from the solid material adjacent the outlets. These means may be of any of a number of constructions well-known to the art and adapted for the particular type of catalyst and gas flow for which the vessels are to be used. Also, there may be provided within the regenerator, which may be of multi-stage type, adequate means for control of catalyst temperature during the contaminate combustion reaction. Positioned above the regenerator and connected thereto through conduit 30 is surge hopper 32 having a catalyst inlet conduit 33 and a gas inlet conduit 34 connected into its upper end. Also provided on said surge hopper is a catalyst level indicator 35. Arranged between the reaction and regeneration vessels are two similar draft-type conveyors 36 and 36'. Both conveyors are similar and may be described by consideration of conveyor 36. Conveyor 36 is made up of a casing including a substantially closed rising leg 37, a substantially closed descending leg 38, a substantially closed head section 39 communicating with the upper ends of said legs, and a curved boot section 40 communicating with the lower ends of said legs. Positioned longitudinally of said legs is an endless draft mechanism which may be in the form of an endless chain 41 having a plurality of flights 42 attached at intervals along its length. Said chain 41 passes over a drive sprocket 43 positioned in the head section 39 and also extends through the boot section 40. The drive sprocket 43 is driven through shaft 44 by suitable driving means of standard construction such as a variable speed motor 80 or a motor associated with shaft 44 through a variable speed drive. The rotation of sprocket 43 is such as to cause the endless draft mechanism to move upwardly through the rising leg 37 and downwardly through the descending leg 38. Within the descending leg 38 there is provided a volume obstructing means 45 which extends along a major portion of the leg length. Also provided on the leg 38 and at an intermediate level along its length are gas outlet louvers 46 which provide a solid-gas disengaging space. Surrounding the louvers 46 and attached to the leg 38 is a closed gas outlet chamber 47 having a gas outlet pipe therefrom 48 carrying a valve 49 thereon. It will be apparent to those skilled in the art that modified means may be substituted for that shown which will permit the disengagement and withdrawal of gas from leg 38. Extending downwardly from the upper section of rising leg 37 to a level shortly therebelow on the descending leg 38 is a connecting conduit 50 carrying a flow control valve 51 thereon. Connected into the head section 39 is a gas inlet conduit 52 having control valve 53 thereon. An opening is provided in the roof of the boot section 40 and this opening is covered by a feed chamber 54 into which the regenerator catalyst drain conduit 28 connects and from the top of which gas may be introduced through pipe 55.

In an exemplary operation, the reactor may be operated at a pressure of, say, ten pounds per square inch gauge and the regenerator at a pressure only slightly above atmospheric. In such an operation, hydrocarbon vapor is introduced through conduit 11 in reactor 10 and contacted countercurrently with the catalyst therein, reaction products finally being withdrawn through conduit 12 at the top of the reactor. Alternatively, concurrent flow of reactant and catalyst may be provided by reversing the functions of conduits 11 and 12. The reaction temperature may be of the order of 800° F. to 950° F. The catalyst to hydrocarbon ratio may vary from about 0.5 to 5.0 volumes of catalyst per volume of hydrocarbon (measured as a liquid at 60° F.) The hydrocarbon charge space velocity may vary from about 0.5 to 5.0 volumes of oil measured as a liquid at 60° F. per volume of reaction zone catalyst capacity. An inert purge gas such as steam or flue gas in introduced through conduit 13 at a pressure slightly higher than that in the reaction zone thereabove so as to substantially prevent escape of hydrocarbons through catalyst drain conduit 14. Spent catalyst bearing a carbonaceous contaminate deposit is withdrawn as a substantially compact stream through conduit 14 at a rate controlled either by throttling valve 15 or preferably by the rate of movement of the draft mechanism within the conveyor 36′ through the adjustment of the speed of motor 80′. The catalyst is then moved from the boot section 40′ upwardly through the rising leg 37′ as a substantially compact continuous column by means of the endless draft mechanism. The portion of the catalyst reaching the upper section of rising leg 37′ passes as a confined stream through conduit 33 and into surge hopper 32 positioned above the regenerator. The rate of catalyst withdrawal from hopper 32 is generally controlled by the rate of catalyst withdrawn from the bottom of the regenerator through conduit 28 either by means of valve 29 or variable speed motor 80. It may, however, be controlled in suitable operations by valve 31 on conduit 30. The remaining portion of the catalyst reaching the upper section of rising leg 37′ passes through conduit 50′ into the descending leg 38′ so as to provide therein a substantially compact column of catalyst. An inert gas such as steam or flue gas is introduced into the boot section 40′ through pipe 55′ at a rate controlled in a manner and for purposes which will be discussed hereinafter. Inert gas is withdrawn from gas outlet chamber 47′ at an intermediate level on descending leg 38′ through conduit 48′. Spent catalyst passes from the surge hopper 32 into and through the regenerator 25 wherein it is contacted with a combustion supporting gas such as air introduced through conduit 26 and withdrawn through conduit 27. The regenerated catalyst passes from the lower end of the regenerator through conduit 28 at a rate controlled either by throttling valve 29 or conveyor 36 into the boot section 40 of conveyor 36. The operation of conveyor 36 and the catalyst flow therein is similar to that described hereinabove as regards conveyor 36′. A portion of the catalyst reaching the upper end of rising leg 37 is withdrawn to surge hopper 19 through conduit 20 and the remaining portion passes through conduit 50 to the descending leg 38. Inert gas is introduced into the boot section 40 through conduit 55 and is withdrawn from the descending leg 38 through conduit 48. An inert seal gas is introduced into the upper end of surge hopper 19 through conduit 21. The rate of such gas introduction is controlled by diaphragm valve 60 operated by differential pressure control mechanism 61 so that the seal gas pressure within the upper section of hopper 19 is somewhat above (for example, one-half pound per square inch) that in the reaction vessel 10. Thus, the escape of hydrocarbons from the upper section of the reactor is substantially prevented. A major portion of the seal gas introduced into hopper 19 passes downwardly therethrough and into the reactor along with the reaction products. A minor portion of the seal gas introduced into hopper 19 passes upwardly through conduit 20 and then in part downwardly through the compact column of catalyst maintained in descending leg 38 until it reaches the gas outlet louvers 46 on said descending leg, and in part downwardly through the column of solid material in rising leg 37, then around the boot section and up through the leg 38 to outlet louvers 46. Alternatively, the introduction of seal gas into hopper 19 may be omitted and the seal gas may be introduced into the head section 39 of conveyor 36 through conduit 52. The rate of such gas introduction is then similarly controlled by diaphragm-operated valve 53, and differential pressure control mechanism 62 so as to maintain a somewhat higher seal gas pressure within the upper section of the conveyor casing than the existing gaseous pressure within the upper section of the reactor 19.

From the above, it will be apparent that when a state of steady and balanced operation is accomplished in the above apparatus, the total volumetric catalyst flow to and from vessels 10 and 25 may be maintained substantially equal and constant by proper adjustment of the speed of movement of the draft mechanism within conveyors 36 and 36′. This speed adjustment may be most readily obtained by control of the speed of the variable speed drive motors 80 and 80′ or by use of constant speed drive motor connected to the conveyor drive shafts through suitable adjustable drive means. When a balanced operation is accomplished, it will be apparent that the amount of catalyst rising in the conveyor rising legs will be equal to the volumetric catalyst circulation through vessel 10 or 25 plus the amount of catalyst recycled downwardly through the conveyor descending legs. The amount of catalyst so recycled may be properly and automatically controlled by means further described hereinafter so that at a state of balanced operation no substantial throttling of the catalyst stream passing through recycle conduits 50 and 50′ by valves 51 and 51′ is necessary.

The maintenance of a substantially compact column of catalyst in both the rising and descending legs of the conveyors as described hereinabove provides an effective seal or substantial resistance to gas flow between the reactor and regenerator vessels. This seal has been made further effective by the use of inert seal gas at the proper locations. Thus, at boot section 40′ of conveyor 36′ the inert gas may be introduced through pipe 55′ at a rate sufficient to provide an inert gas pressure in the boot section somewhat above (for example, one-half pound per square inch) the pressure in the bottom of the reactor 10. A portion of the inert gas so introduced may pass upwardly through the substantially compact stream of catalyst in the drain conduit 14 and into the reactor 10. Another portion of the inert gas will pass upwardly through the descending leg 38′ and by withdrawal therefrom through a conduit 48′. The withdrawal of gas through conduit 48′ is throttled by valve 49′ so as to limit the pressure differential between the level of the louvers 46′ and the boot section 40' below that which would cause substantial bubbling of the catalyst. A differential pressure control mechanism, not shown, may be provided, to automatically control valve 48'. In some cases wherein an inert seal gas is maintained within the lower section of the reactor 10, the pressure in boot section 40' may be maintained equal to or even lower than that in reactor 10. On the other hand, inert gas introduced through conduit 55 into boot section 40 is maintained therein at substantially lower pressure than that in boot section 40', such lower pressure being somewhat above that in the bottom of the regenerator 25 or slightly therebelow. The inert gas from the boot section 40 may flow in part through drain conduit 28 into the regenerator and in part upwardly through the descending leg 38 from which it is withdrawn through conduit 48. In addition, as has been pointed out hereinabove, an inert gas may be introduced through conduit 52 into the head section 39 of conveyor 36. This gas passes in part downwardly through conduit 20 and hopper 19 to the reactor and in part downwardly through rising leg 37 and descending leg 38 to be withdrawn at conduit 48. Thus, it will be seen any interflow of hydrocarbon reactants or regeneration gas between the reactor or regenerator vessels is substantially prevented.

It will be noted that the solid material from the upper section of conveyor 36 is conducted as a confined stream from the point of its discharge from conveyor 36 to the point of its entry into the conversion vessel 10. It will be apparent that in order to limit the amount of seal gas required to maintain a higher seal gas pressure in head section 39 or hopper 19 than the gaseous pressure in vessel 10, it is very desirable that the solid material stream between the conveyor discharge and converter inlet be at least through a portion of its length a substantially compact stream. It will be apparent that in the example described hereinabove, a substantially compact stream of solid material is maintained extending from the surface of the bed of solid material in hopper 19 to the top of the vessel 10.

In the above operation, the reactor and regenerator vessels are shown to be maintained under substantially different gaseous pressure. The invention is also applicable to operations wherein the reactor and regeneration vessels are both maintained at substantially equal superatmospheric pressure. In such an application, the operation would be substantially as described hereinabove except that the inert gaseous pressure maintained in the boot section 40 would then be raised to a pressure slightly above that in the regenerator 25 and an inert gas would be introduced either into hopper 32 through conduit 34 or into head section 39' through conduit 52' in a manner similar to that described for head section 39 and hopper 19.

In the draft conveyors of the prior art of which the Redler conveyor is the typical example, there is no provision for introduction of solid material into the descending leg thereof. Therefore, in the draft conveyors of the prior art the endless chain and flights attached thereto move downwardly through a substantially empty descending leg, which descending leg acts as a by-pass for gas between the upper and lower ends of the communicating rising leg, thereby effectively preventing the maintenance of a seal between the ends of the rising leg. As has already been pointed out, the provision of a method and apparatus for maintenance of a seal column of catalyst within a descending leg is the subject of the copending application, Serial Number 601,090, filed in the United States Patent Office on June 23, 1945. This application is directed to an improvement in that method and apparatus as will be shown hereinafter.

The catalyst introduced into the descending leg may be transferred from the rising leg through a conduit such as 50 as described hereinabove, or it may be transferred into the descending legs 38 and 38' from hoppers 19 and 32 through conduits 65 and 66 respectively. In some operations, catalyst introduced to the descending leg may be obtained from some source other than from catalyst at the upper end or discharged from the upper end of the rising leg. For example, catalyst may be introduced into an intermediate section of descending leg 38 from a source not shown through conduit 67. In general, however, it has been found preferable to recycle back to the descending leg part of the catalyst which has been conducted through the rising leg.

In order that the amount of catalyst required to maintain a substantially compact column within the descending leg may be only a minor fraction of the amount of catalyst conveyed through the rising leg, some means should be provided to limit the rate of downward catalyst flow within the descending leg. In order to assure a substantially lower volumetric rate of catalyst flow within the conveyor descending legs 38 and 38' than exists in the conveyor rising legs 37 and 37' respectively, the volume obstructing means 45 may be provided within the descending legs. Such obstructing means is shown both in Figure 1 and in Figure 2, Figure 2 being a cross-sectional view taken at line 2—2 on the descending leg 38. From study of Figure 2, it will be seen that the volume obstructing means 45 is of such size and shape as to substantially reduce the free cross-sectional area of the descending leg 38 without interference with the free vertical movement of the endless chain 41 or flights 42. It will also be observed from Figure 2 that the descending leg 38 is of rectangular cross-section but it will be understood that the invention is not to be limited to legs of such cross-sectional shape. Legs of circular or other practical cross-sectional shapes may also be used with properly modified flights and properly modified volume obstructing means therein.

Turning to Figure 3, we find a sectional view taken on the rising leg 37. From this figure, it will be seen that no volume obstructing means is provided within the rising leg and by comparison with Figure 2, it will be seen that the free volume of the descending leg is substantially less than that of the rising leg. It will be understood that the proper construction of the volume obstructing member 45 will vary depending upon the type and size of solid material particles and the type of flights used on the conveyor chain. It has been found in general that the relative free cross-sectional area of the rising and descending legs should be such as to provide a ratio of volumetric catalyst flow in the rising and descending legs of about 2 to 4 to 1 respectively. Volume obstructing means of shapes other than that shown may be used, if desired, provided that such obstructing means is such as will not interfere with the free movement of the draft chain and flights and such as will provide a clearance between the obstructing means and the flights substantially greater than the particle size involved. In some cases, it may be desirable to limit the total cross-section of the descending leg substantially below the total cross-section of the rising leg and to provide flights so modified as to permit their free movement through the smaller descending leg. In such case, the use of additional volume obstructing means may be eliminated.

It has been found that when such compact columns of catalyst are provided within the descending leg, the catalyst tends to pack together at the bend adjacent the communication of the boot section with the lower end of the descending leg. This causes an undue frictional resistance to the movement of the conveyor flights resulting in excessive power requirements for the conveying operation. It has been found that this difficulty may be eliminated and the power required by the conveying operation materially decreased by the passage of controlled quantities of gas through the catalyst, especially at the bend in the boot at which it tends to pack. Thus, in conveyor 36, inert gas introduced through pipe 55 moves countercurrently through the catalyst at the bend in boot section 40 adjacent the connection of that boot section with the end of the descending leg 38. The gas then passes countercurrently upwardly through the descending leg 38 as has been shown hereinabove and is disengaged from the catalyst in descending leg at louver 46 and withdrawn through pipe 48. In addition, it has been found that by proper control of the gas introduced through pipe 55, the volumetric rate of catalyst flow downwardly through conduit 38 may be controlled within certain limits. Generally, however, it is desirable to employ a combination of volume obstructing means and controlled gas introduction through pipe 55 for the best catalyst flow control.

The proper rate of gas introduction into the boot section through conduit 55 will vary depending upon certain factors such as the characteristics of the catalyst employed, the type of conveyor flights employed and rate of their movement, and the gaseous pressures involved. The proper gas rates may be determined by any specific application of the invention by relatively few routine experiments. In general, for a clay type granular catalyst of about 8 or 30 mesh size and for a flue gas type of seal gas the rate of flue gas introduction through conduit 55 into the boot section should be such that the gas so introduced plus that passing into the boot section from the rising leg should give rise under a static pressure of pounds per square inch to a pressure drop due to its flow through the catalyst of about 5" to 9" of water per foot at the flight arm restriction. The proper length of the catalyst column maintained within the descending leg will vary, depending upon the pressure differential between the reaction and regeneration vessels. When this pressure differential is relatively small a relatively short column of catalyst within the descending leg will provide adequate seal between the vessels. The proper location of the means for gas-solid disengagement and gas withdrawal from the descending leg will also depend to some extent on the pressure differential between the upper and lower sections of the conveyor casing. Thus, in conveyor 36 shown in Figure 1 herein the pressure in the boot section is relatively low and that in the head section is relatively high. It is desirable to locate the gas disengaging and withdrawal means at a level along the descending leg nearer to the lower end than to the upper end thereof. On the other hand, in the case of conveyor 36' wherein the higher pressure is in the boot section, the gas disengaging and withdrawal means should be located nearer the upper end of the descending leg. It will be understood, however, that the exact location of the gas disengaging and withdrawal means may be varied over considerable limits by proper control of the gas outlet pressure therefrom.

Turning now to Figure 4, we find a detailed sketch, partially in section, of a conveyor boot section and of a gas disengaging and withdrawal means from the descending leg. In this figure, there is shown the lower end of a rising leg 70 connecting into a boot section 71 which boot section is of expanded cross-sectional area, adjacent its communication with the descending leg 72. The expanded section 73 of the boot section is of such cross-section that the lower end of the descending leg 72 fits loosely therein so as to leave a space around its periphery for gas-solid disengagement and gas withdrawal. Enclosing member 74 is provided to enclose the gas-solid disengaging space so formed. A gas outlet conduit 75 with valve 76 thereon connects into this enclosure for gas withdrawal. A hopper 77 connects into an opening on the roof of the boot section and a catalyst inlet pipe 78 is connected to the top of the hopper. An inert gas inlet pipe 79 is also provided at the top of the hopper. The modification shown in Figure 4 is particularly well adapted for applications wherein the gaseous pressure in the boot section is relatively low. As has been pointed out hereinabove, however, by throttling the gas flow from the outlet 75 so as to maintain substantial pressure in the level of gas-solid disengaging space, the modification may also be applied to operations wherein substantial pressure exists at the boot section.

The overall length of conveyors employed for this invention will depend on the length of the reaction and regeneration vessels and may vary from about 10 to 100 feet in height, but in any event, it will be apparent that by the provision of substantial solid material seals in the conveyor rising and descending legs the requirements for space-consuming feed lock systems above and below the regenerator vessels has been eliminated, thereby permitting the use of substantially shorter conveyors in such a process than has been heretofore possible. Moreover, since the solid material may flow to and from the conveyors by gravitational flow, and is then conveyed as a substantially compact column en masse within the conveyor rising leg. Excessive attrition losses such as occurred in the scraping type spiral conveyors and forced feed rotary valves used heretofore by the art is substantially avoided. Furthermore, by the use of volume obstructing means in the conveyor descending leg and the introduction of properly controlled amounts of gas into the conveyor boot section according to the teaching of this invention, the rate of solid material movment through the descending leg may be adjustably controlled and the interference with the movement of the draft mechanism resulting from the maintenance of the desirable seal column of solid material in the conveyor descending legs are substantially reduced.

Although the method and apparatus of this invention are particularly and specifically applicable to cyclic hydrocarbon conversion processes of the type described hereinabove, it should be understood that the invention is not limited in its application thereto but may be applied to a large number of processes involving the movement of particle form solid material which may or may not be catalytic in its nature between separate chambers wherein it is contacted with different gaseous materials. It will also be understood that the details of apparatus construction and operation conditions and technique, as shown in the drawings and described hereinabove are merely exemplary in nature and are in no way to be construed as limiting the scope of this invention except as it is otherwise limited in the following claims.

I claim:

1. Apparatus for conducting particle form solid material between two chambers while maintaining a substantial seal between said chambers, which apparatus comprises: a casing including a substantially closed elongated rising leg, a substantially closed elongated descending leg, a substantially closed head section communicating the upper ends of said legs and a curved boot section communicating the lower ends of said legs; an endless draft conveying mechanism adapted to move longitudinally of said legs; an inlet for solid material into said boot section; an outlet for solid material discharge within the upper section of said rising leg; means to introduce particle form solid material into said descending leg at a level a substantial distance above its lower end so as to maintain a column of said solid material therein; means to introduce gas into said boot section at a predetermined rate; and means to withdraw gas from said descending leg at a level between its lower end and the level of said solid material introducing means thereinto.

2. An apparatus according to claim 1 with the added improvement of means to maintain an inert gaseous pressure within the upper section of said casing above that in either of said chambers.

3. In an apparatus wherein a particle form solid material is moved serially through two separate chambers maintained under different gaseous atmospheres, apparatus for transferring particle form solid material from one of said chambers to the other while maintaining a substantial seal between said chambers which apparatus comprises: a conveyor casing including an elongated substantially closed rising leg, an elongated substantially closed descending leg of substantially less free internal volume along at least most of its length than said rising leg, a substantially closed head section communicating the upper ends of said legs, and a substantially closed curved boot section communicating the lower ends of said casing; an endless draft conveying mechanism adapted to move longitudinally of said legs; an inlet for solid material into said boot section; an outlet for solid material discharge within the upper section of said rising leg; means to introduce particle form solid material into said descending leg at a level a substantial distance above its lower end so as to maintain a column of said solid material therein; means to introduce gas into said boot section at a predetermined rate; and means to withdraw gas from said descending leg at a level between its lower end and the level of said solid material introducing means thereinto.

4. In an apparatus wherein a particle form solid material is moved serially through two separate chambers maintained under different gaseous atmospheres, apparatus for transferring particle form solid material from one of said chambers to the other while maintaining a substantial seal between said chambers which apparatus comprises: a conveyor casing including an elongated substantially closed rising leg, an elongated substantially closed descending leg of substantially less free internal cross sectional area along at least most of its length than said rising leg, a substantially closed head section communicating the upper ends of said legs, and a substantially closed curved boot section communicating the lower ends of said casing; an endless draft conveying mechanism mounted to move longitudinally of said legs; means for moving said draft conveyor mechanism at a controlled rate to convey solid material within said casings; an inlet for solid material into said boot section; means to conduct said solid material from one of said chambers as a confined stream to said inlet; an outlet for discharge of said solid material within the upper section of said rising leg; means to pass solid material from said outlet as a confined stream to the other of said chambers; means to introduce particle form solid material into said descending leg at a level a substantial distance above its lower end so as to maintain a column of said solid material therein; means to introduce gas into said boot section at a predetermined rate; and means to withdraw gas from said descending leg at a level between its lower end and the level of said solid material introducing means thereinto.

5. In an apparatus wherein a particle form solid material is moved serially through two separate chambers maintained under different gaseous atmospheres, apparatus for transferring particle form solid material from one of said chambers to the other while maintaining a substantial seal between said chambers which apparatus comprises: a conveyor casing including an elongated substantially closed rising leg, an elongated substantially closed descending leg of substantially less free internal cross sectional area along at least most of its length than said rising leg, a substantially closed head section communicating the upper ends of said legs, and a substantially closed curved boot section communicating the lower end of said casing; an endless draft conveying mechanism mounted to move longitudinally of said legs; means for moving said draft conveyor mechanism to convey solid material within said casings; an inlet for solid material into said boot section; means to conduct said solid material from one of said chambers as a confined stream to said inlet; an outlet for discharge of said solid material within the upper section of said rising leg; means to conduct solid material from said outlet as a confined stream to the other of said chambers; means to introduce particle form solid material into said descending leg at a level a substantial distance above its lower end so as to maintain a column of said solid material therein; means to introduce gas into said boot section at a predetermined rate; and means to withdraw gas from said descending leg at a level between its lower end and the level of said solid material introducing means thereinto and means to maintain an inert gaseous atmosphere within the upper section of said casing at a gaseous pressure above that in either of said chambers.

6. In an apparatus wherein a particle form solid material is moved serially through two separate chambers maintained under different gaseous atmospheres, apparatus for transferring particle form solid material from one of said chambers to the other while maintaining a substantial seal between said chambers which apparatus comprises: a conveyor casing including an elongated substantially closed rising leg, an elongated substantially closed descending leg of substantially less free internal cross sectional area along at least most of its length than said rising leg, a substantially closed head section communicating the upper ends of said legs, and a substantially closed curved boot section communicating the lower ends of said casing; an endless draft conveyor mechanism mounted to move longitudinally of said legs; means for moving said draft conveyor mechanism to convey solid material within said casings; an inlet for solid material into said boot section; means to pass said solid material from one of said chambers as a confined stream to said inlet; an outlet for discharge of said solid material within the upper section of said rising leg; means to pass solid material from said outlet as a confined stream to the other of said chambers; means to pass a portion of said solid material from the upper section of said rising leg to a point in said descending leg within the upper section thereof so as to maintain a column of said solid material within said descending leg; means to introduce gas into said boot section at a predetermined rate; and means to withdraw gas from said descending leg under controlled pressure at a level intermediate its lower end and the point of solid material introduction thereinto.

7. In a hydrocarbon conversion system wherein a particle form solid catalyst is passed as a substantially compact column cyclically through separate conversion and regeneration vessels, apparatus for transfer of solid material from the regeneration to the conversion vessel while maintaining a seal between said vessel which apparatus comprises: a conveyor casing including a substantially closed elongated rising leg, a substantially closed elongated descending leg, a substantially closed head section communicating the upper ends of said legs and a curved boot section communicating the lower ends of said legs; a draft conveying mechanism extending as an endless chain longitudinally through said legs; means to move said mechanism at a controlled rate so as to convey solid particles through said legs; volume obstructing means positioned within and along at least most of said descending leg such as to substantially reduce the free internal volume of said descending leg without interference with the movement of said draft conveying mechanism; an inlet for said solid material into said boot section, means to pass said solid material from said regeneration vessel as a confined stream to said inlet; an outlet for discharge of said solid material near the upper end of said rising leg; means to pass solid material from said outlet as a confined stream to said conversion vessel; means to conduct a portion of the solid material from said rising leg to a point within the upper section of said descending leg; means to introduce an inert gas into said boot section; means to maintain an inert gaseous pressure in the upper section of said casing above the gaseous pressures in the conversion and regeneration vessels and means to withdraw gas without substantial solid entrainment from an intermediate section of said descending leg.

8. In a hydrocarbon conversion system wherein a particle form solid catalyst is passed as a substantially compact column cyclically through separate conversion and regeneration vessels, apparatus for transfer of solid material from the regeneration to the conversion vessel while maintaining a seal between said vessel which apparatus comprises: a conveyor casing including a substantially closed elongated rising leg, a substantially closed elongated descending leg, a substantially closed head section communicating the upper ends of said legs and a curved boot section communicating the lower ends of said legs; a draft conveying mechanism extending as an endless chain longitudinally through said legs; means to move said mechanism so as to convey solid particles through said legs; volume obstructing means positioned within and along at least most of said descending leg such as to substantially reduce the free internal volume of said descending leg without interference with the movement of said draft conveying mechanism; an inlet for said solid material into said boot section; means to conduct said solid material from said regeneration vessel as a confined stream to said inlet; an outlet for discharge of said solid material near the upper end of said rising leg; means to conduct solid material from said outlet as a confined stream to said conversion vessel; a conduit extending between the upper section of said rising leg to a point therebelow in the upper section of said descending leg; throttle means in said conduit; means to introduce an inert gas into said boot section; means to maintain an inert gaseous pressure in the upper section of said casing above the gaseous pressures in the conversion and regeneration vessel, and means to withdraw gas without substantial solid entrainment from an intermediate section of said descending leg.

9. Apparatus for conducting particle form solid material between two chambers while maintaining a substantial seal between said chambers, which apparatus comprises: a casing including a substantially closed elongated rising leg, a substantially closed elongated descending leg, a substantially closed head section communicating the upper ends of said legs and a curved boot section communicating the lower ends of said legs; an endless draft conveying mechanism adapted to move longitudinally of said legs; an inlet for solid material into said boot section; an outlet for solid material discharge within the upper section of said rising leg; a conduit connected between a point on the upper section of said rising leg to a point therebelow on said descending leg; means to introduce gas into said boot section at a predetermined rate; and means to withdraw gas from said descending leg substantially below the point of connection of said conduit.

10. Apparatus for conducting particle form solid material between two chambers while maintaining a substantial seal between said chambers, which apparatus comprises: a casing including a substantially closed elongated rising leg, a substantially closed elongated descending leg, a substantially closed head section communicating the upper ends of said legs and a curved boot section communicating the lower ends of said legs; said boot section being for at least a short length at its end adjacent the lower end of said descending leg of substantially greater cross-section than that of said descending leg so that the end of said descending leg fits loosely into the end of said boot section leaving a substantial open annular space for gas escape; an endless draft conveying mechanism adapted to move longitudinally of said legs; an inlet for solid material into said boot section; an outlet for solid material discharge within the upper section of said rising leg; means to introduced particle form solid material into said descending leg at a level a substantial distance above its lower end so as to maintain a column of said solid material therein; means to introduce gas into said boot section at a predetermined rate.

11. Apparatus for conducting particle form solid material between two chambers while maintaining a substantial seal between said chambers, which apparatus comprises: a casing including a substantially closed elongated rising leg, a substantially closed elongated descending leg, a substantially closed head section communicating the upper ends of said legs and a curved boot section communicating the lower ends of said legs; an endless draft conveying mechanism adapted to move longitudinally of said legs; an inlet for solid material into said boot section; an outlet for solid material discharge within the upper section of said rising leg; means to introduce particle form solid material into said descending leg at a level a substantial distance above its lower end so as to maintain a column of said solid material therein; means to introduce gas into said boot section at a predetermined rate; means defining a gas-solid disengaging chamber associated with said descending leg at a level above said boot section and below said means to introduce solid material into said descending leg; and a gas outlet from said disengaging chamber.

12. In an apparatus wherein a particle form solid material is moved serially through two separate chambers maintained under different gaseous atmospheres, apparatus for transferring particle form solid material from one of said chambers to the other while maintaining a substantial seal between said chambers which apparatus comprises: a conveyor casing including an elongated substantially closed rising leg, an elongated substantially closed descending leg of substantially less free internal volume along at least most of its length than said rising leg, a substantially closed head section communicating the upper ends of said legs, and a substantially closed curved boot section communicating the lower ends of said casing; an endless draft conveyor mechanism mounted to move longitudinally of said legs; means for moving said draft conveyor mechanism to convey solid material within said casings; an inlet for solid material into said boot section, means to pass said solid material from one of said chambers as a confined stream to said inlet; an outlet for discharge of said solid material within the upper section of said rising leg; means to pass solid material from said outlet as a confined stream to the other of said chambers; means to conduct a portion of said solid material from the upper section of said rising leg to a point in said descending leg within the upper section thereof so as to maintain a column of said solid material within said descending leg; means to introduce gas into said boot section at a predetermined rate; means defining a gas-solid disengaging chamber at an intermediate level on said descending leg; a gas outlet from said disengaging chamber; throttling means on said gas outlet; and means to maintain an inert gaseous atmosphere within the upper section of said casing at a pressure above that in either of said separate chambers.

13. In a hydrocarbon conversion system wherein a particle form solid catalyst is passed as a substantially compact column cyclically through separate conversion and regeneration vessels, apparatus for transfer of solid material from the regeneration to the conversion vessel while maintaining a seal between said vessels which apparatus comprises: a conveyor casing including a substantially closed elongated rising leg, a substantially closed elongated descending leg, a substantially closed head section communicating the upper ends of said legs and a curved boot section communicating the lower ends of said legs; a draft conveying mechanism extending as an endless chain longitudinally through said legs; adjustable means to move said mechanism so as to convey solid particles through said legs; volume obstructing means positioned within and along at least most of said descending leg such as to substantially reduce the free internal volume of said descending leg without interference with the movement of said draft conveying mechanism; an inlet for said solid material into said boot section; means to conduct said solid material from said regeneration vessel as a confined stream to said inlet; an outlet for discharge of said solid material near the upper end of said rising leg; a closed surge chamber below the level of said outlet on said rising leg and above said conversion vessel; means to pass solid material from said outlet as a confined stream to said surge chamber; means to pass solid material from said surge chamber to said conversion vessel as a substantially compact confined stream; means to conduct a portion of said solid material from said rising leg to a point within the upper section of said descending leg; means to introduce an inert gas into said boot section; means to maintain an inert gaseous pressure in the upper section of said casing above the gaseous pressures in the conversion and regeneration vessels; means defining a disengaging chamber associated with said descending leg in the intermediate section thereof; and means to withdraw gas from said disengaging chamber under controlled pressures.

14. In a system wherein a particle form solid contact mass material is passed serially through each of two separate vessels maintained under different gaseous pressures, apparatus for transfer of said solid material from one of said solid vessels to the other while maintaining a substantial seal between said vessels which apparatus comprises: a conveyor casing including a substantially closed rising leg, a substantially closed descending leg of substantially less free internal cross-sectional area than said rising leg along at least most of its length, a substantially closed head section communicating the upper ends of said legs and a curved boot section communicating the lower ends of said legs; a head sprocket mounted within said head section and adjustable driving means for said sprocket; an endless chain extending longitudinally through the conveyor casing and over said sprocket so as to travel upwardly through said rising leg and downwardly through said descending leg; a plurality of flights connected along said chain; an inlet to said boot section, a conduit extending downwardly from one of said two chambers to said inlet for flow of solid material into said boot section; an outlet for solid material discharge near the upper end of said rising leg; passage defining means for flow of solid material from said outlet to the other of said vessels and means to throttle the solid flow from said passage defining means so as to provide a solid material seal between said outlet and said vessel;

passage defining means for flow of solid material from the upper section of said rising leg to a point within the upper section of said descending leg; a gas inlet to said boot section and means to introduce gas thereinto at a controlled rate; means defining a gas-solid disengaging chamber associated with said descending leg at a level above its lower end and below the point of solid introduction thereinto; and a gas outlet from said disengaging chamber.

15. In a hydrocarbon conversion system wherein a particle form solid material is passed as a substantially compact column cyclically through separate conversion and regeneration vessels, apparatus for transfer of solid material from the regeneration to the conversion vessel while maintaining a seal between said vessels which apparatus comprises: a conveyor casing including a substantially closed elongated rising leg, a substantially closed elongated descending leg, a substantially closed head section communicating the upper ends of said legs and a curved boot section communicating the lower ends of said legs; draft mechanism in said casing comprising an endless chain adapted to move longitudinally of the legs, a plurality of flights attached along said chain and means for moving said chain at a controlled, adjustable rate; volume obstructing means positioned within and along most of the length of said descending leg such as to reduce the free volume of said leg without obstructing the path for chain and flight movement; an inlet to said boot section; a conduit extending downwardly from said regeneration chamber to said inlet for flow of solid material into said boot section; an outlet for solid material discharge near the upper end of said rising leg, means to conduct solid material from said outlet to said conversion vessel as a throttled confined flowing mass so as to maintain a solid material seal between said reactor and said outlet; an inlet for solid material on said descending leg within its upper section; passage defining means for gravity flow of a portion of the solid material conveyed upwardly through said rising leg to said inlet on said descending leg; a gas inlet to said boot section and means to introduce gas thereinto at a controlled rate; means defining a gas-solid disengaging chamber associated with said descending leg at a level above its lower end and below the point of solid introduction thereinto; and a gas outlet from said disengaging chamber; means to introduce an inert gas into the upper section of said casing and means to maintain the pressure of said inert gas in the upper section of said casing above that in said regeneration and conversion vessels.

16. In a hydrocarbon conversion system wherein a particle form solid catalyst is passed as a substantially compact column cyclically through separate conversion and regeneration vessels, apparatus for transfer of solid material from the regeneration to the conversion vessel while maintaining a seal between said vessels which apparatus comprises: a conveyor casing including a substantially closed elongated rising leg, a substantially closed, upright descending leg, a substantially closed head section communicating the upper ends of said legs and a curved boot section communicating the lower ends of said legs and being of a cross-sectional area at least adjacent the lower end of said descending leg substantially greater than that of said descending leg so that the end of said descending leg fits loosely into said boot section leaving an open space around its periphery for escape of gas from said casing; draft mechanism in said casing comprising an endless chain adapted to move longitudinally of the legs, a plurality of flights attached along said chain and adjustable drive means to move said chain; volume obstructing means positioned within and along most of the length of said descending leg such as to reduce the free volume of said leg without obstructing the path for chain and flight movement; a solid material inlet to said boot section; a conduit extending downwardly from said regeneration chamber to said inlet for flow of solid material into said boot section; an outlet for solid material discharge near the upper end of said rising leg; means to conduct solid material from said outlet to said reactor as a throttled confined flowing mass so as to maintain a solid material seal between said reactor and said outlet; an inlet for solid material on said descending leg within its upper section; passage defining means for gravity flow of a portion of the solid material conveyed upwardly through said rising leg to said inlet on said descending leg; a gas inlet to said boot section and means to introduce an inert gas thereinto; and means to maintain an inert gaseous pressure within the upper section of said casing above that in said conversion and regeneration vessels.

17. In a process wherein particle form solid material is conveyed as a substantially compact column upwardly through a confined rising leg from the lower end thereof to a selected discharge level within the upper section thereof by means of an endless draft conveying mechanism moving upwardly through said rising leg and downwardly through a confined descending leg communicating at its end with said rising leg through suitable communicating sections, the method of maintaining a substantial seal between the upper and lower ends of said rising leg which comprises: introducing a controlled portion of said solid material into said descending leg a substantial distance above its lower end, introducing a gas at a controlled rate into the section communicating the lower ends of said legs so as to control the downward rate of solid material flow within said descending leg and withdrawing gas from said descending leg at a level substantially below the level of solid material introduction thereinto.

18. In a hydrocarbon conversion process wherein a particle form solid catalyst is moved cyclically through separate conversion and regeneration zones, the method of transferring catalyst from one of said zones to the other while maintaining a substantial seal therebetween which method comprises: continuously moving an elongated draft conveyor mechanism upwardly through a confined rising leg and downwardly through a confined descending leg, communicating at its ends with said rising leg through suitable communicating sections, conducting catalyst from one of said vessels into the communicating section between the lower ends of said legs, conducting a portion of the catalyst conveyed through said rising leg from the upper section of said rising leg as a confined substantially compact, gravity flowing stream to the other of said vessels, conducting the remainder of said catalyst as a confined stream into the upper section of said descending leg so as to provide a column of said catalyst therein, maintaining an inert gaseous atmosphere above the catalyst in said rising and descending legs at a pressure above that in said conversion and regeneration vessels, introducing a gas at a controlled rate into the section communicating the lower ends of said legs so as to control the downward rate of solid material movement within said descending leg and withdrawing gas from said descending leg at a level substantially below the level of solid material introduction thereinto.

19. In a hydrocarbon conversion process wherein a particle form solid catalyst is moved cyclically through separate conversion and regeneration zones, the method of transferring catalyst from one of said zones to the other while maintaining a substantial seal therebetween which method comprises: continuously moving an elongated draft conveyor mechanism upwardly through a confined rising leg and downwardly through a confined descending leg, communicating at its ends with said rising leg through suitable communicating sections, said descending leg being of substantially less free cross-sectional area along most of its length than said rising leg, conducting catalyst from one of said vessels into the communicating section between the lower ends of said legs, conducting a portion of the catalyst conveyed through said rising leg from the upper section of said rising leg as a confined substantially compact, gravity flowing stream to the other of said vessels, conducting the remainder of said catalyst as a confined stream into the upper section of said descending leg so as to provide a column of said catalyst therein, maintaining an inert gaseous atmosphere above the catalyst in said rising and descending legs at a pressure above that in said conversion and regeneration vessels, introducing a gas at a controlled rate into the section communicating the lower ends of said legs so as to control the downward rate of solid material flow within said descending leg and withdrawing gas from said descending leg at a level substantially below the level of solid material introduction thereinto.

20. In a process wherein particle form solid material is conveyed as a substantially compact column upwardly through a confined rising leg from the lower end thereof to a selected discharge level within the upper section thereof by means of an endless draft conveying mechanism moving upwardly through said rising leg and downwardly through a confined descending leg communicating at its ends with said rising leg through suitable communicating sections, the method of maintaining a substantial seal between the upper and lower ends of said rising leg which comprises: introducing a controlled portion of said solid material into said descending leg a substantial distance above its lower end, introducing a gas at a controlled rate into the section communicating the lower ends of said legs so as to control the resistance to downward movement of said conveying mechanism within said descending leg and withdrawing gas from said descending leg at a level substantially below the level of solid material introduction thereinto.

21. In a hydrocarbon conversion process wherein a particle form solid catalyst is moved cyclically through separate conversion and regeneration zones, the method of transferring catalyst from one of said zones to the other while maintaining a substantial seal therebetween which method comprises: continuously moving an elongated draft conveyor mechanism upwardly through a confined rising leg and downwardly through a confined descending leg, communicating at its ends with said rising leg through suitable communicating sections, conducting catalyst from one of said vessels into the communicating section between the lower ends of said legs, conducting a portion of the catalyst conveyed through said rising leg from the upper section of said rising leg as a confined substantially compact, gravity flowing stream to the other of said vessels, conducting the remainder of said catalyst as a confined stream into the upper section of said descending leg so as to provide a column of said catalyst therein, maintaining an inert gaseous atmosphere above the catalyst in said rising and descending legs at a pressure above that in said conversion and regeneration vessels, introducing a gas at a controlled rate into the section communicating the lower ends of said legs so as to control the resistance to the downward movement of said draft conveyor mechanism through said descending leg and withdrawing gas from said descending leg at a level substantially below the level of solid material introduction thereinto.

22. The method for conveying particle form solid materials which comprises: continuously moving an endless draft conveyor mechanism through a confined, closed path of travel consisting of a confined rising leg through which it moves upwardly, a separate confined descending leg through which it moves downwardly and suitable sections communicating the upper ends and communicating the lower ends of said rising and descending legs; introducing particle form solid material from an outside source into said closed path at at least one point near the lower end of said rising leg; withdrawing contact material from said closed path at at least one point within the upper section of said rising leg; introducing particle form solid material to said closed path at at least one point in said descending leg a substantial distance above its lower end so as to provide a substantially compact column of said solid material therebelow in said descending leg; introducing a gas at a controlled rate into the section communicating the lower ends of said legs so as to control the downward rate of solid material flow within said descending leg and withdrawing gas from said descending leg at a level substantially below the level of solid material introduction thereinto.

ERIC V. BERGSTROM.

REFERENCES CITED

The following references are of record in the file of this patent:

UNITED STATES PATENTS

| Number | Name | Date |
| --- | --- | --- |
| 2,311,564 | Munday | Feb. 16, 1943 |
| 2,345,626 | Pattee | Apr. 4, 1944 |
| 2,370,950 | Gibb et al. | Mar. 6, 1945 |